July 9, 1935.                B. E. CARL                2,007,365
            PROCESS FOR THE MAKING OF MEDICINAL OIL
                    Filed Feb. 23, 1932         2 Sheets-Sheet 1
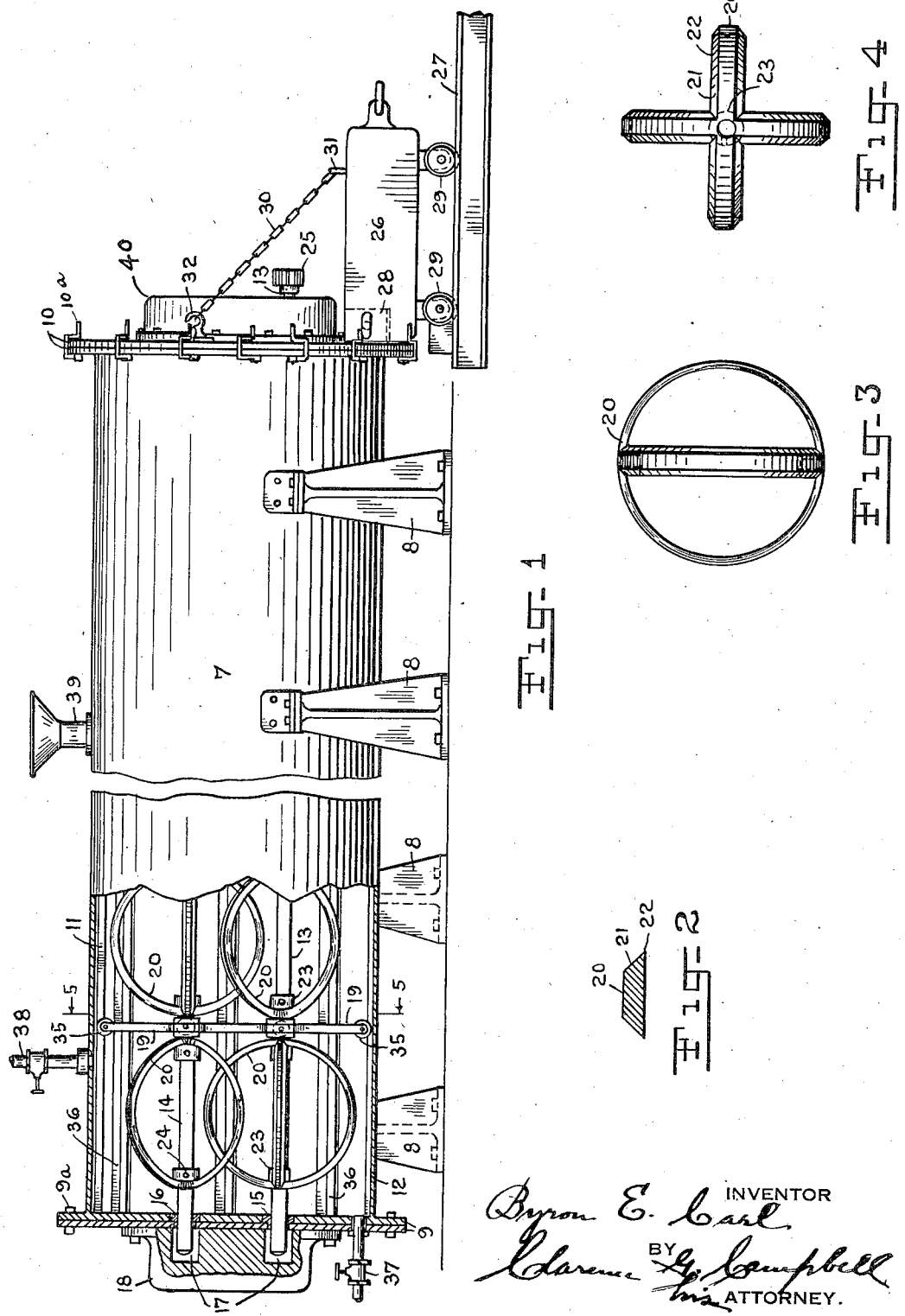

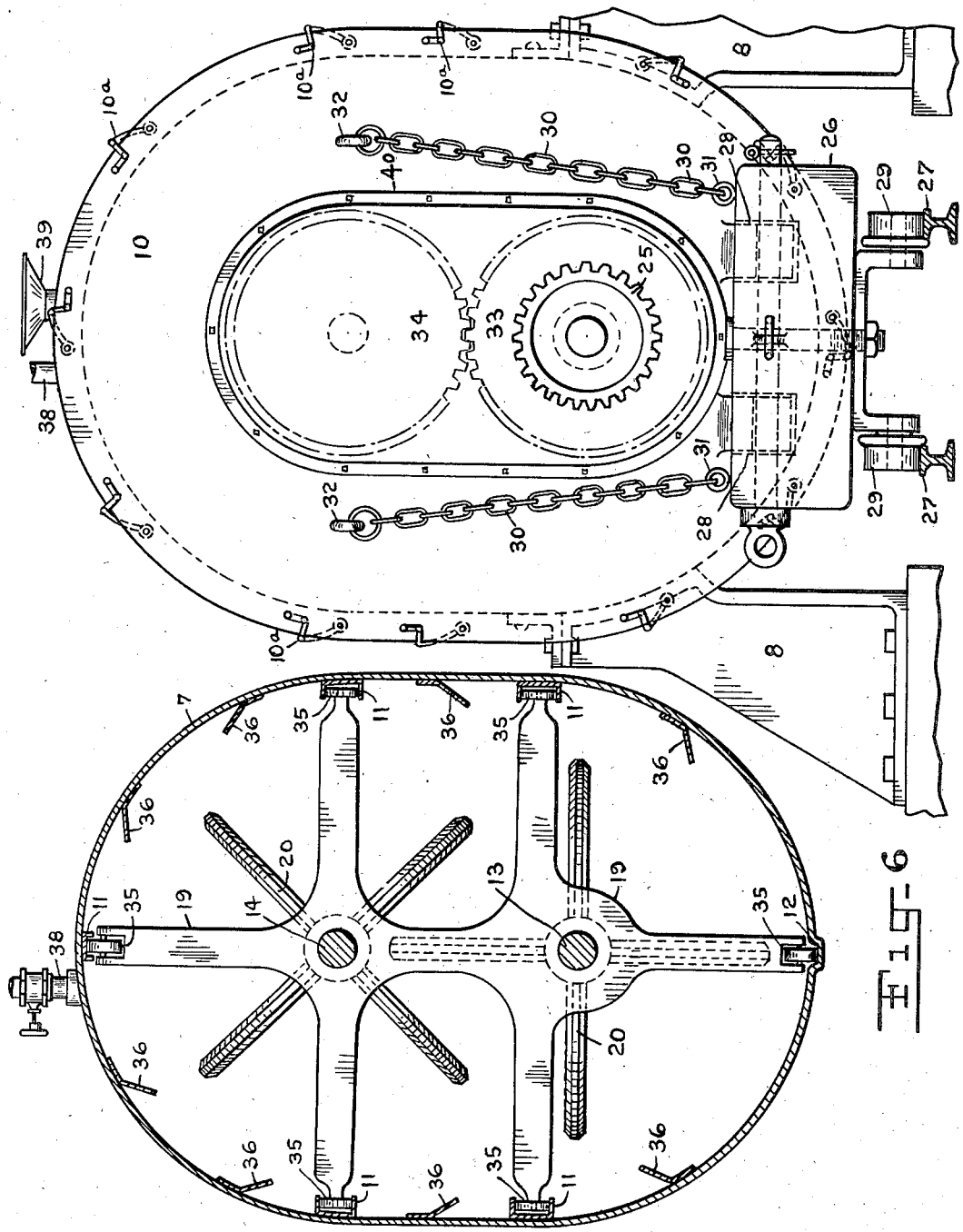

Patented July 9, 1935

UNITED STATES PATENT OFFICE 2,007,365

PROCESS FOR THE MAKING OF MEDICINAL OIL

Byron E. Carl, New York, N. Y., assignor of one-third to Clarence G. Campbell, Pelham Manor, N. Y.

Application February 23, 1932, Serial No. 594,528

10 Claims. (Cl. 196—40)

My invention relates to a process for purifying oils for medicinal purposes and its novelty consists in the steps of said process as will be more fully hereinafter pointed out.

There are many unsatisfied commercial demands for an absolutely pure mineral oil devoid of taste, odor, color and unsaturated constituents and possessing a high degree of stability under the influence of air, light and heat and particularly for medicinal use. But this problem has not been solved because of the abstruse chemical problems involved and the mineral oil now used for medicinal purposes lacks many of these essential requirements.

My process for the first time solves this problem and produces a mineral oil having all of the above described required qualities for medicinal use.

One of the objects of the present invention is the production of hydrocarbon oils suitable for medicinal and technical purposes devoid of taste, odor, color and of unsaturated constituents and possessing a high degree of stability under the influence of air, light and heat, by repeated treatment of a suitable raw material with a metallic halide, preferably anhydrous and active aluminum chloride.

A further object of this invention is the application of a mechanical beating, cutting and tearing device with which appropriate and highly efficient intimate contacting of the oil with the metal halide can be effected.

It is known that metallic halides, in particular $AlCl_3$, react with crude hydrocarbon oils in a variety of ways. At lower temperature the action of the $AlCl_3$ consists mainly in the removal of impurities, such as sulphur and nitrogen compounds, in the conversion of hydrocarbonaceous constituents of an unsaturated nature to the corresponding products of saturation and further in the formation of hydrocarbon compounds of higher molecular weight, i. e. by polymerization. The reverse action, i. e. the conversion of higher molecular hydrocarbons to such of lower molecular weight, although not completely avoidable takes place but to a very small degree when the treatment with the halide is effected at atmospheric temperatures or below.

Besides working at atmospheric temperatures or below the action of the metal halide on the raw hydrocarbons can also be kept under closer control, as is so often the case in chemical processes, by working in dilute solution and, if so desired, by the application of artificial cooling i. e. dissipation of the whole or a part of the heat formed in the reaction and by friction of the apparatus with the oil being treated by any of the well known and accepted means such as by external cooling during the intimate contacting of the oil and aluminum chloride and the tearing apart of the same. Straight run crude oil naphtha, pretreated with a small percentage of concentrated sulphuric acid in order to avoid dissipation of any part of the metal halide and of known boiling range may very well serve as a diluent.

Besides the difficulties in the chemical treatment of crude hydrocarbon oils with metal halides, especially with $AlCl_3$, as a result of the multiplicity in the nature in which this latter agent can react with the former there exists also a number of difficulties of a purely mechanical nature in effecting really efficient contact between the halide and the oil. Owing to the low fluidity of the oil and that of the sticky, tarry $AlCl_3$ sludge formed in the reaction and which latter tends to occlude considerable portions of unconsumed chloride, only a part of the chloride employed becomes effective and further, since the difference in the specific gravities of the oil and the sludge tar is, relatively taken, very small, there exists also a tendency of the latter to form fairly stable emulsions with the former. Various means have been recommended to effect a thorough mixing of the chloride with the oil. Violent agitation of the oil and chloride mixtures with mechanical stirrers as is customary to employ in carrying out chemical reactions have proven to be of little avail since such devices effect solely a rotative movement of the body of oil carrying the chloride in suspension, but, as previously mentioned, a considerable part of the chloride rapidly becomes enclosed in the sludge and thereby loses its effectiveness, which results in a loss, i. e. undue waste in chloride and oil. Efficient contacting therefore, can only then be attained when besides a thorough mixing of the chloride and oil also a breaking up of the agglomerations of the sludge and particles of unused chloride is effected, this resulting in a re-exposure of the occluded but still active chloride. This greatly desired result can be secured effectively and efficiently with the following described mechanism.

Referring to the drawings Figure 1 is a side elevation of my device with a portion broken away to show the interior and broken for convenience in illustration.

Figure 2 is a cross section of one of the arms of a cutting, tearing and beating member.

Figure 3 is a side elevation of one of said cutting, tearing and beating members.

Figure 4 is a top plan view of Figure 3.

Figure 5 is a sectional elevation of Figure 1 on the line 5—5.

Figure 6 is a front elevation of Figure 1 with side portions broken away for convenience in illustration.

In the drawings 7 is a long cylindrical tank rigidly supported on the usual standards 8 and having end members 9 and 10 of usual construction rigidly secured thereto, 9 being rigidly secured at 9a and 10 removably secured by clamps 10a. On the interior of the tank 7 are rigidly mounted longitudinally of the tank U-shaped tracks 11 on each side and at the top of the tank and a longitudinal U-shaped groove 12 along the bottom of said tank serves the same purpose as 11.

A pair of rotating shafts 13 and 14 run the entire length of said tank 7 and are supported at the inner end on the usual bearings 15 and 16 and extend into the openings 17 in the end member 18 which is rigidly secured to said end 9. Supporting frame members are mounted over the said shafts 13 and 14 and have roller members 35 at the ends of each of the frame arms adapted to travel in the tracks 11 and 12. Cutting, tearing and beating members 20 having beveled sides 21 and cutting edges 22 are mounted rigidly on said shafts 13 and 14 on either side of the frame members 19 by means of the sleeve members 23 and set screws 24.

A cut gear 25 is rigidly secured to the outer end of shaft 13 and is adapted to be meshed and driven by a gear from a shaft driven from a source of power, all of which is not shown herein. A cut gear 33 is rigidly secured to shaft 13 and is adapted to mesh with gear 34 rigidly secured to shaft 14 so as to drive the same.

A car 26 runs on tracks 27 on wheels 29 and is secured at 28 to the end 10 and by chains 30 is secured at 31 to the front of said car 26 and at 32 is secured to the front 10 in the usual manner.

In operating my device as the outside power driven shaft through gear (not shown) meshed with gear 25 is set in operation shaft 13 is operated and through gears 33 and 34 shaft 14 is also operated simultaneously in the opposite direction. The cutting, tearing and beating members 20 rigidly secured to said shafts 13 and 14 are thereby rotated in opposite directions on said two shafts so as to cut up, tear apart and beat the oil and aluminum chloride placed in tank 7 for treatment as described herein.

Whenever it is desired to clean or get into said tank 7 for any reason the clamps 10a are unfastened and by pulling on the car 26 and drawing it out on tracks 27 the end 10 is pulled out with it and the shafts 13 and 14 and the beating, tearing, cutting members 20 mounted thereon and the frame members 19 mounted between said members 20 on said shafts 13 and 14 will travel therewith, supporting all on the wheels 35 in the tracks 11 and 12.

The tank 7 also has a drain pipe 37 with the usual control valve. A feed or inlet pipe 38 with the usual control valve is also connected to the tank 7 and a further feeding pipe 39 with the usual type of funnel is connected to the tank 7 so that by means of pipes 38 and 39 the oil, aluminum chloride and other material to be used in the process described can be placed in the tank 7 as desired and the treated material drawn off either in sludge or in the resulting product of the operation through the pipe 37. 40 is an elliptical protective flange rigidly secured to the front of the end member 10.

Another difficulty in the efficient treating of hydrocarbon oils with Al Cl₃ is encountered in the clean separation of the treated oil and the Al Cl₃ sludge, since as a rule, a more or less considerable part of the sludge remains in a fine suspension in the oil and settles out but very slowly, if at all.

This difficulty can easily be overcome by agitation of the treated oil after removal of the bulk of the Al Cl₃ sludge with a small percentage, say one to two percent by weight of H₂ SO₄ of 60° Baumé prior to the treatment with a new batch of chloride. After application of several Al Cl₃ dumps the washing of the oil with 60° Baumé acid after each or every second treatment can be dispensed with, since after removal of the bulk of the unsaturated constituents contained in the original oil with the preceding Al Cl₃ treatments the sludge shows an increasing tendency to agglomerate to large chunks leaving the oil practically clear, or faintly opalescent.

In the dyeing of animal fibre, for instance wool, it is common practice to accelerate the "wetting" of the fibre by means of a "wetting agent" which is applied in quantities of one-half to one percent by weight of the fibre. The addition of the wetting agent tends to reduce surface tension between the fibre and the bath, which results in a rapid soaking of the liquid into the fibre, i. e. a rapid becoming wet of the latter. An analogous effect is obtained when adding a small quantity of a wetting agent to the oil, Al Cl₃ and sludge mixture prior to the termination of the treatment. The surface tension of the sludge particles is substantially reduced so the agglomeration of these latter is accelerated. The addition of the wetting agents is more beneficious in the first treatments with Al Cl₃ portions than in the final ones. As a wetting agent any one of those used in the textile industry can be employed, such for example as benzolbutanolsulphuric acid.

If the production of absolutely odorless and tasteless medicinal oils possessing a very low iodine number and complying rigorously with the specifications of the U. S. Pharmacopia is aimed at, it is necessary to subject the Al Cl₃ treated oils to a more or less drastic treatment with concentrated, or better, fuming sulphuric acid prior to the washing and the percolation of the oil through clay or other decolorizers. The procedure is as follows: After exhaustive treatment of the oil with Al Cl₂ the last traces of the latter are removed by washing with one to two per cent by weight of 60° Baumé sulphuric acid whereupon the oil is treated with one-half to one pound per gallon of commercial fuming acid applied in one or more dumps. After settling and removal of the acid sludge the oil is washed first with one to two percent by weight of 60° Baumé acid, then with three to four percent by volume of acid of thirty to thirty-five percent, followed by a wash with twenty to thirty percent volume of dilute acid 1–10 or one-tenth normal strength. After removal of the dilute acid the oil is given a wash with one-fourth to one-third of its volume of water to which a small percentage, five to ten percent, of a commercial appropriately denatured alcohol is added. This alcohol wash is then followed by one or several washes with pure water until the point of neutrality has been practically reached. The oil is then clarified by warming with closed steam to around 200° F. and settling.

The clarified oil is then percolated hot through dried clay or suitable mesh and the decolorized oil transferred to a still in which the diluent is removed by distillation with fire and steam, or, if so desired, under reduced pressure.

The reduced oil is then withdrawn from the still, contacted hot with dried fine clay of eight to ten pounds per barrel of oil and filtered. The product thus obtained representing an oil suitable for use as a medicinal oil.

The process as set forth with the above is applicable to raw materials of any description which have, or have not undergone pretreatments for the purpose of removing resinous and asphaltic compounds, impurities such as sulphur or nitrogen compounds and solid hydrocarbons compounds by means of the various known dewaxing methods.

From raw materials of a paraffinic nature the solid hydrocarbons can be separated subsequent to the treatment with the metal halide or/and to the finishing treatments with concentrated $H_2SO_4$ or fuming acid.

I claim:

1. A process for the making of medicinal oil from hydrocarbon oil comprising the intimate contacting of said hydrocarbon oil with continuously torn apart and reexposed active aluminum chloride at atmospheric temperature, removing the sludge formed by said reaction, washing the treated oil with one to two percent by weight of 60° Baumé sulphuric acid, treating the said oil with one-half to one pound per gallon of commercial fuming sulphuric acid, washing the said oil with one to two percent by weight of 60° Baumé sulphuric acid, further washing said oil with three to four percent by volume of 30 to 35° Baumé sulphuric acid, further washing said oil with twenty to thirty percent by volume of dilute sulphuric acid $\frac{N}{10}$ washing said oil by one-fourth to one-third of its volume with water, washing said oil with distilled water until point of neutrality has been practically reached, the oil is then clarified by warming to around 200° F. and settled, the clarified oil is then percolated hot through dried clay of suitable mesh, the treated oil is then distilled and the reduced oil is then contacted hot with dried fine clay and filtered.

2. A process for the making of medicinal oil from hydrocarbon oil comprising diluting the oil to be treated with untreated straight run naphtha, the intimate contacting and continuously tearing apart and reexposing of active aluminum chloride with said hydrocarbon oil at atmospheric temperature, removing the sludge formed by said reaction, washing the treated oil with one to two percent by weight of 60° Baumé sulphuric acid, treating the said oil with one-half to one pound per gallon of commercial fuming sulphuric acid, washing the said oil with one to two percent by weight of 60° Baumé sulphuric acid, further washing said oil with three to four percent by volume of 30 to 35° Baumé sulphuric acid, further washing said oil with twenty to thirty percent by volume of dilute sulphuric acid $\frac{N}{10}$ washing said oil by one-fourth to one-third of its volume with water, washing said oil with distilled water until point of neutrality has been practically reached, the oil is then clarified by warming to around 200° F. and settled, the clarified oil is then percolated hot through dried clay of suitable mesh, the treated oil is then distilled and the reduced oil is then contacted hot with dried fine clay and filtered.

3. A process for the making of medicinal oil from hydrocarbon oil comprising diluting the oil to be treated with treated straight run naphtha, the intimate contacting of said hydrocarbon oil with active and continuously torn apart and reexposed aluminum chloride at atmospheric temperature, removing the sludge formed by said reaction, washing the treated oil with one to two percent by weight of 60° Baumé sulphuric acid, treating the said oil with one-half to one pound per gallon of commercial fuming sulphuric acid, washing the said oil with one to two percent by weight of 60° Baumé sulphuric acid, further washing said oil with three to four percent by volume of 30 to 35° Baumé sulphuric acid, further washing said oil with twenty to thirty percent by volume of dilute sulphuric acid $\frac{N}{10}$ washing said oil by one-fourth to one-third of its volume with water, washing said oil with distilled water until point of neutrality has been practically reached, the oil is then clarified by warming to around 200° F. and settled, the clarified oil is then percolated hot through dried clay of suitable mesh, the treated oil is then distilled and the reduced oil is then contacted hot with dried fine clay and filtered.

4. A process for the making of medicinal oil from hydrocarbon oil comprising the intimate contacting of said hydrocarbon oil with active aluminum chloride and reexposure of the occluded aluminum chloride below atmospheric temperature, removing the sludge formed by said reaction, washing the treated oil with one to two percent by weight of 60° Baumé sulphuric acid, treating the said oil with one-half to one pound per gallon of commercial fuming sulphuric acid, washing the said oil with one to two percent by weight of 60° Baumé sulphuric acid, further washing said oil with three to four percent by volume of 30 to 35° Baumé sulphuric acid, further washing said oil with twenty to thirty percent by volume of dilute sulphuric acid $\frac{N}{10}$ washing said oil by one-fourth to one-third of its volume with water, washing said oil with distilled water until point of neutrality has been practically reached, the oil is then clarified by warming to around 200° F. and settled, the clarified oil is then percolated hot through dried clay of suitable mesh, the treated oil is then distilled and the reduced oil is then contacted hot with dried fine clay and filtered.

5. A process for the making of medicinal oil from hydrocarbon oil comprising pretreating the raw hydrocarbon oil with a small percentage of concentrated sulphuric acid, the intimate contacting of said hydrocarbon oil with active and continuously torn apart and reexposed aluminum chloride at atmospheric temperature, removing the sludge formed by said reaction, washing the treated oil with one to two percent by weight of 60° Baumé sulphuric acid, treating the said oil with one-half to one pound per gallon of commercial fuming sulphuric acid, washing the said oil with one to two percent by weight of 60° Baumé sulphuric acid, further washing said oil with three to four percent by volume of 30 to 35° Baumé sulphuric acid, further washing said oil with twenty to thirty percent by volume of dilute sulphuric acid $$\frac{N}{10}$$

washing said oil by one-fourth to one-third of its volume with water, washing said oil with distilled water until point of neutrality has been practically reached, the oil is then clarified by warming to around 200° F. and settled, the clarified oil is then percolated hot through dried clay of suitable mesh, the treated oil is then distilled and the reduced oil is then contacted hot with dried fine clay and filtered.

6. A process for the making of medicinal oil from hydrocarbon oil comprising the intimate contacting and continued tearing apart and reexposure of the active aluminum chloride with said hydrocarbon oil below atmospheric temperature, removing the sludge formed by said reaction, washing the treated oil with one to two percent by weight of 60° Baumé sulphuric acid, treating the said oil with one-half to one pound per gallon of commercial fuming sulphuric acid, washing the said oil with one to two percent by weight of 60° Baumé sulphuric acid, further washing said oil with three to four percent by volume of 30 to 35° Baumé sulphuric acid, further washing said oil with twenty to thirty percent by volume of dilute sulphuric acid $$\frac{N}{10}$$

washing said oil by one-fourth to one-third of its volume with water, washing said oil with distilled water until point of neutrality has been practically reached, the oil is then clarified by warming to around 200° F. and settled, the clarified oil is then percolated hot through dried clay of suitable mesh, the treated oil is then distilled and the reduced oil is then contacted hot with dried fine clay and filtered.

7. A process for the making of medicinal oil from hydrocarbon oil comprising diluting the oil to be treated with pure crude oil naphtha of known boiling range pretreated with a small percentage of concentrated sulphuric acid in order to avoid dissipation of any part of the metal halide, the intimate contacting of said hydrocarbon oil with active aluminum chloride at atmospheric temperature, removing the sludge formed by said reaction, washing the treated oil with one to two percent by weight of 60° Baumé sulphuric acid, treating the said oil with one-half to one pound per gallon of commercial fuming sulphuric acid, washing the said oil with one to two percent by weight of 60° Baumé sulphuric acid, further washing said oil with three to four percent by volume of 30 to 35° Baumé sulphuric acid, further washing said oil with twenty to thirty percent by volume of dilute sulphuric acid $$\frac{N}{10}$$

washing said oil by one-fourth to one-third of its volume with water, washing said oil with distilled water until point of neutrality has been practically reached, the oil is then clarified by warming to around 200° F. and settled, the clarified oil is then percolated hot through dried clay of suitable mesh, the treated oil is then distilled and the reduced oil is then contacted hot with dried fine clay and filtered.

8. A process for the making of white oil from hydrocarbon oil comprising the continuous intimate contacting, tearing apart and reexposure of occluded active aluminum chloride with said hydrocarbon oil below atmospheric temperature, removing the sludge formed by said reaction, washing the treated oil with 60° Baumé sulphuric acid, treating the said oil with commercail fuming sulphuric acid, washing the said oil with 60° Baumé sulphuric acid, further washing said oil with 30 to 35° Baumé sulphuric acid, further washing said oil with dilute sulphuric acid $$\frac{N}{10}$$

washing said oil with distilled water until point of neutrality has been practically reached, the oil is then clarified by warming to around 200° F. and settled, the clarified oil is then percolated hot through dried clay of suitable mesh, the treated oil is then distilled and the reduced oil is then contacted hot with dried fine clay and filtered.

9. A process for the making of white oil from hydrocarbon oil comprising the continuous intimate contacting and reexposure of occluded and other active aluminum chloride with said hydrocarbon oil at atmospheric temperature, removing the sludge formed by said reaction, washing the treated oil with 60° Baumé sulphuric acid, treating the said oil with commercial fuming sulphuric acid, washing the said oil with 60° Baumé sulphuric acid, further washing said oil with 30 to 35° Baumé sulphuric acid, further washing said oil with dilute sulphuric acid $$\frac{N}{10}$$

washing said oil with distilled water until point of neutrality has been practically reached, the oil is then clarified by warming to around 200° F. and settled, the clarified oil is then percolated hot through dried clay of suitable mesh, the treated oil is then distilled and the reduced oil is then contacted hot with dried fine clay and filtered.

10. A process for the making of white oil from hydrocarbon oil comprising diluting the oil to be treated with pure crude oil naphtha pretreated with a small percentage of concentrated sulphuric acid in order to avoid dissipation of any part of the metal halide, the continuous intimate contacting and reexposure of occluded and all active aluminum chloride with said hydrocarbon oil below atmospheric temperature, removing the sludge formed by said reaction, washing the treated oil with 60° Baumé sulphuric acid, treating the said oil with commercial fuming sulphuric acid, washing the said oil with 60° Baumé sulphuric acid, further washing said oil with 30 to 35° Baumé sulphuric acid, further washing said oil with dilute sulphuric acid $$\frac{N}{10}$$

washing said oil with distilled water until point of neutrality has been practically reached, the oil is then clarified by warming to around 200° F. and settled, the clarified oil is then percolated hot through dried clay of suitable mesh, the treated oil is then distilled and the reduced oil is then contacted hot with dried fine clay and filtered.

BYRON E. CARL.